United States Patent
Galbraith et al.

(10) Patent No.: US 6,840,344 B2
(45) Date of Patent: Jan. 11, 2005

(54) LUGGAGE RACK AND BACKREST MOUNTING SYSTEM

(75) Inventors: Stephen L. Galbraith, Cedarburg, WI (US); Brian R. Sucharski, Franklin, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 158 days.

(21) Appl. No.: 09/903,433

(22) Filed: Jul. 11, 2001

(65) Prior Publication Data

US 2003/0010556 A1 Jan. 16, 2003

(51) Int. Cl.[7] ............................................. B62M 7/00
(52) U.S. Cl. .................. 180/219; 280/288.4; 297/215.1
(58) Field of Search .............................. 224/413, 418, 224/423, 427–441, 462; 297/215.1, 215.11; 180/219; 280/847, 288.4

(56) References Cited

U.S. PATENT DOCUMENTS

| | | | | |
|---|---|---|---|---|
| 3,850,353 A | * | 11/1974 | Foulds | 224/418 |
| 3,963,158 A | * | 6/1976 | Clenet | 224/418 |
| 4,095,820 A | * | 6/1978 | Hanagan | 224/275 |
| 4,174,796 A | * | 11/1979 | Nakamura | 224/444 |
| 4,195,757 A | * | 4/1980 | Jefferson | 224/414 |
| 4,260,085 A | * | 4/1981 | Jefferson | 224/414 |
| 4,269,335 A | * | 5/1981 | LaRose et al. | 224/443 |
| 4,311,261 A | * | 1/1982 | Anderson et al. | 224/418 |
| 4,485,884 A | * | 12/1984 | Fukunaga et al. | 180/219 |
| 5,544,937 A | * | 8/1996 | Hanagan | 297/215.12 |
| 5,931,360 A | * | 8/1999 | Reichert | 224/413 |
| 6,390,220 B1 | * | 5/2002 | Galbraith et al. | 180/219 |

OTHER PUBLICATIONS

Softail Deuce Chrm. Pasgr Sissy Bar Upright, Harley–Davidson '01 Gen. Motor Access. & Gen. Motor Parts Catlg, Jun. '00, p. 290.

Softail Deuce Chrm. Lugg. Rack, Harley–Davidson '01 Genuine Motor Access. & Genuine Motor Parts Catlg, Jun. '00, p. 310.

* cited by examiner

*Primary Examiner*—Lesley D. Morris
*Assistant Examiner*—Paul Royal, Jr.
(74) *Attorney, Agent, or Firm*—Michael Best & Friedrich LLP

(57) ABSTRACT

A mounting member for mounting a luggage rack and/or a backrest to a motorcycle includes a concave recess on at least one side for snugly receiving a rounded side surface of a backrest assembly. This recess provides support to the back rest assembly such that vertical loads encountered during normal operation are carried by the snug engagement of the concave recess and the rounded side surface, reducing shear stress on fasteners used to couple the backrest to the mounting member. A portion of a motorcycle luggage rack is disposed over a rear portion of the mounting member and fasteners are extended through apertures in the luggage rack and threaded into substantially vertical threaded bores in the mounting member to affix the luggage rack to the mounting member.

19 Claims, 6 Drawing Sheets

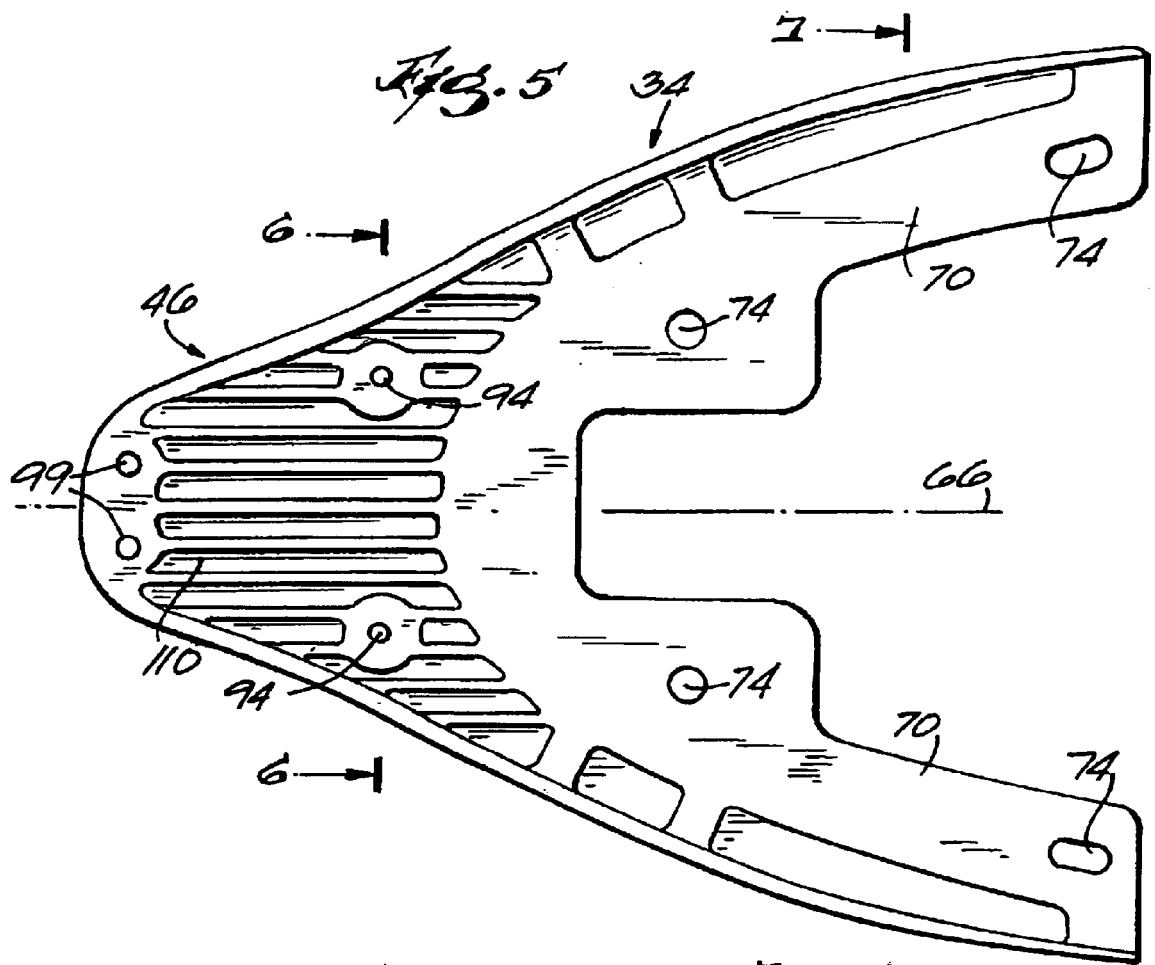
*Fig. 5*
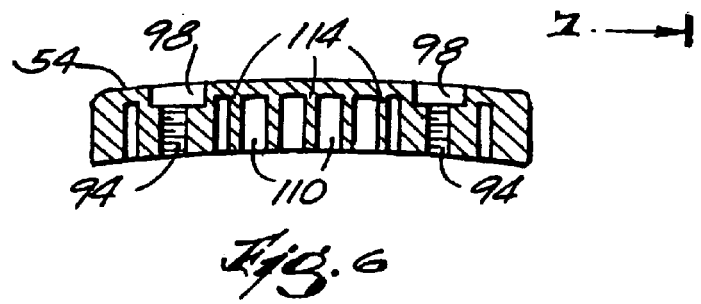
*Fig. 6*
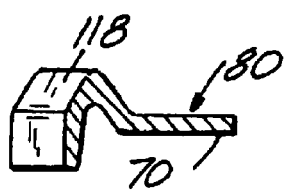 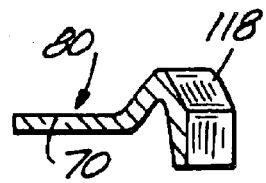
*Fig. 7*

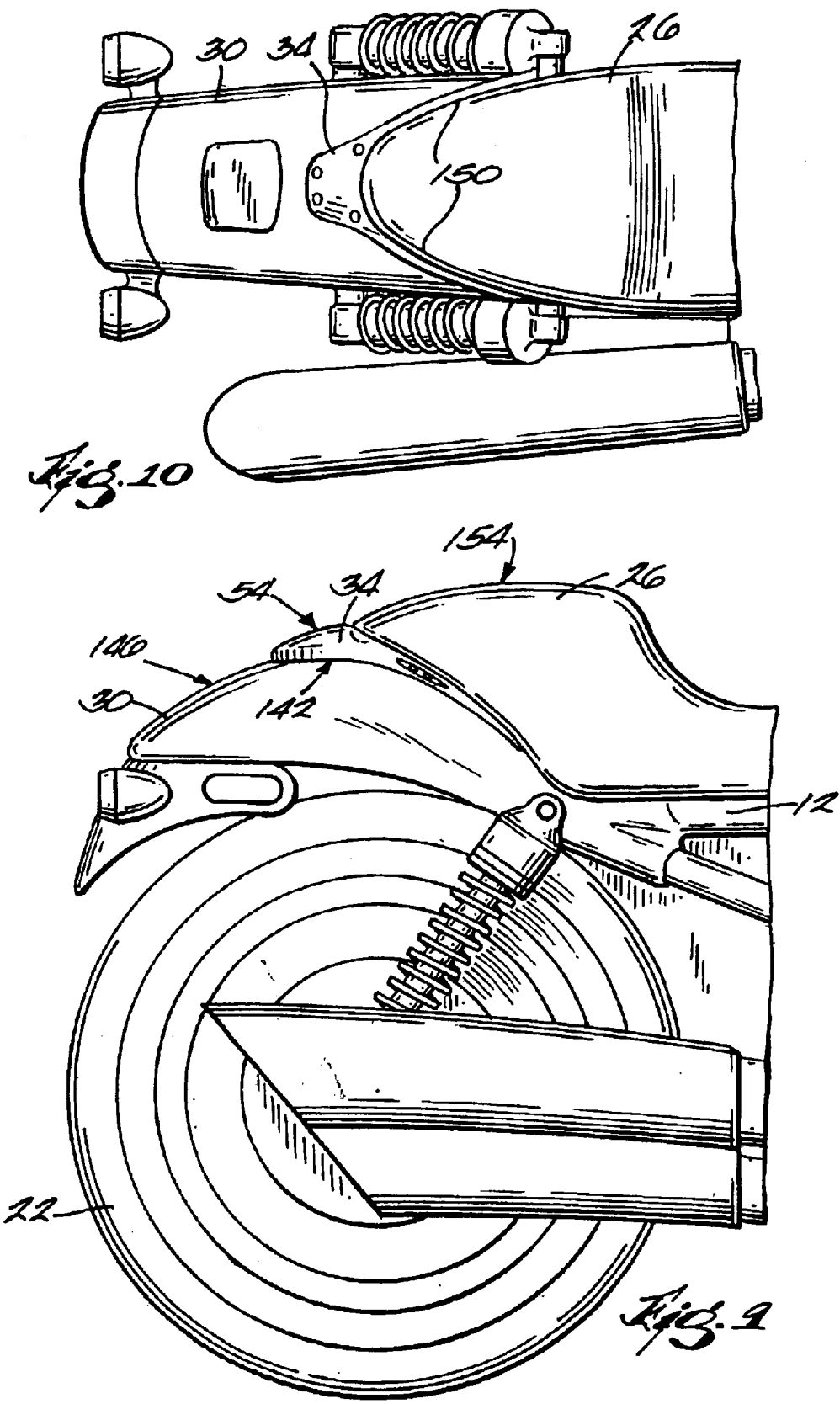

LUGGAGE RACK AND BACKREST MOUNTING SYSTEM

BACKGROUND

The invention relates to a mounting system for a motorcycle backrest and a motorcycle luggage rack.

SUMMARY

The present invention provides a mounting member for mounting a luggage rack or a backrest to the rear end of a motorcycle. The mounting member has a luggage rack or a backrest mounting portion, a top surface, and a bottom surface. A motorcycle seat is mounted over a portion of the mounting member and sandwiches the mounting member between the seat and the seat pan portion of the motorcycle frame. A luggage rack may be mounted to the luggage rack mounting portion of the mounting member or a backrest may be mounted to the backrest mounting portion of the mounting member.

The luggage rack mounting portion of the mounting member preferably extends rearwardly of the seat and may have threaded vertical holes in its top surface. Bolts may extend through holes in the luggage rack and be threaded into the threaded holes to mount the luggage rack to the luggage rack mounting portion. The top surface of the mounting member is preferably curved and the luggage rack mounting portion may have counterbores around the threaded holes to provide substantially flat mounting surfaces for the luggage rack.

The backrest mounting portion preferably has an elongated concave recess and the backrest preferably has a rounded side surface that snugly fits within the concave recess. There are preferably threaded horizontal holes in the concave recesses so bolts may be inserted through holes in the backrest and threaded into the threaded holes of the mounting member to mount the backrest to the mounting member. The backrest may, for example, be made from an elongated rod with a circular cross-section that snugly fits within the concave recesses. The snug fit between the concave recess and the rounded side surface provides additional support to the backrest in a generally vertical direction so shear stress on the bolts used to secure the backrest to the mounting member is reduced.

The mounting member may be generally Y-shaped and the arms of the mounting member may include a collar with an inverted J-shaped cross section. The mounting member may also have a downwardly-opening cavity with several stiffening ribs located within the cavity. Preferably, the stiffening ribs and the J-shaped cross section provide additional strength to the mounting member such that bending stresses placed on the mounting member due to the cantilever style mounting of the luggage rack are reduced.

Preferably, the top and side surfaces of the mounting member have curvatures similar to the outer surfaces of the motorcycle rear fender and the seat. The common curvature shared by the various surfaces generally allows the mounting member to be left on the motorcycle when the backrest and/or the luggage rack are not installed without detracting from the overall aesthetic quality of the motorcycle. In this sense, the mounting member may be termed a "leave-on" piece.

BRIEF DESCRIPTION OF THE DRAWINGS

FIG. 5 is a bottom view of the mounting member illustrated in FIGS. 1–4.

FIG. 6 is a section view taken along line 6—6 of FIG. 5.

FIG. 7 is a section view taken along line 7—7 of FIG. 5.

FIG. 8 is a section view taken along line 8—8 of FIG. 4.

FIG. 9 is a side view of the rear portion of the motorcycle.

FIG. 10 is a top view of the rear portion of the motorcycle.

Figure 1:
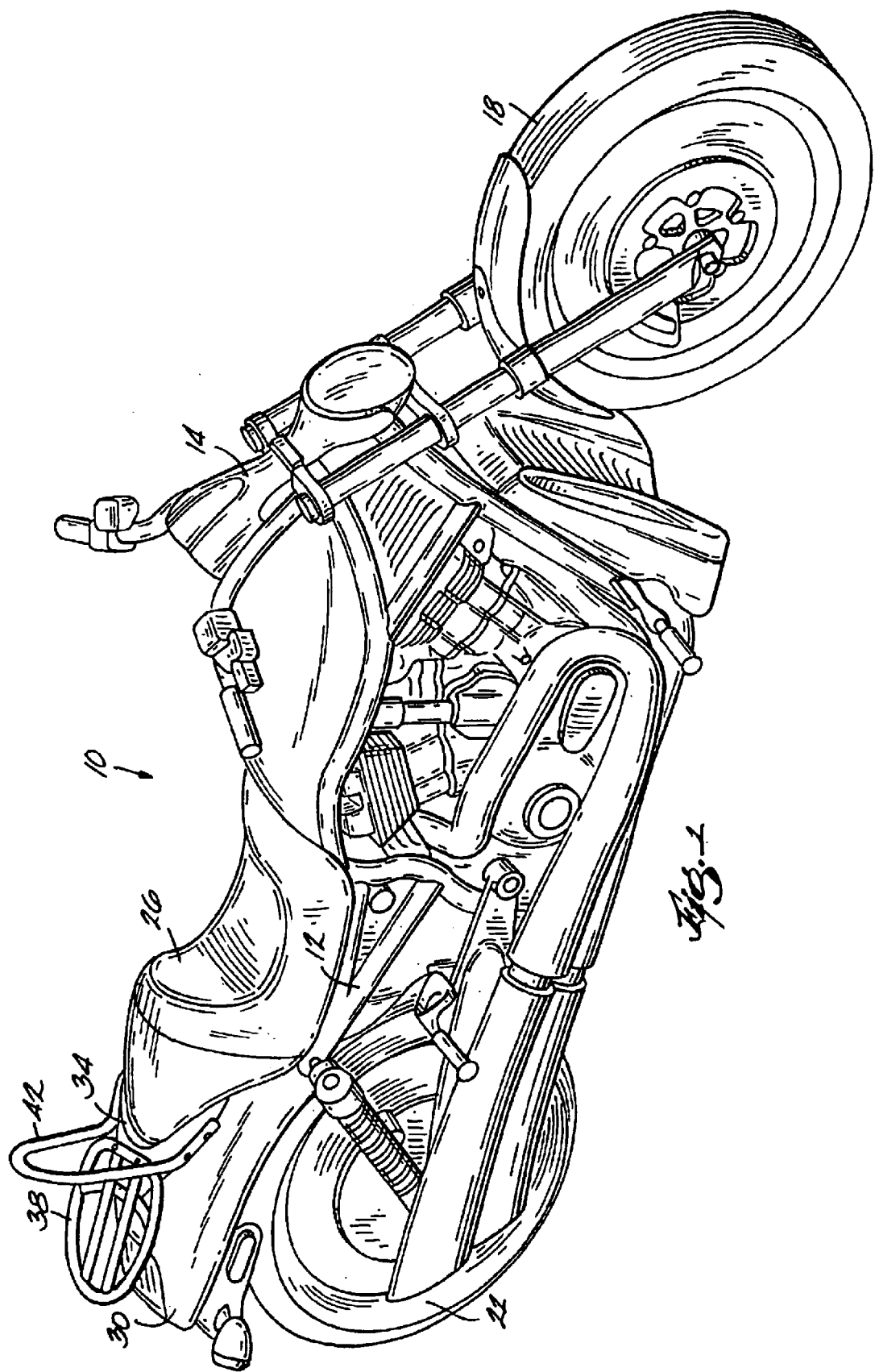
FIG. 1 is a perspective view of a motorcycle embodying the current invention.
Figure 2:
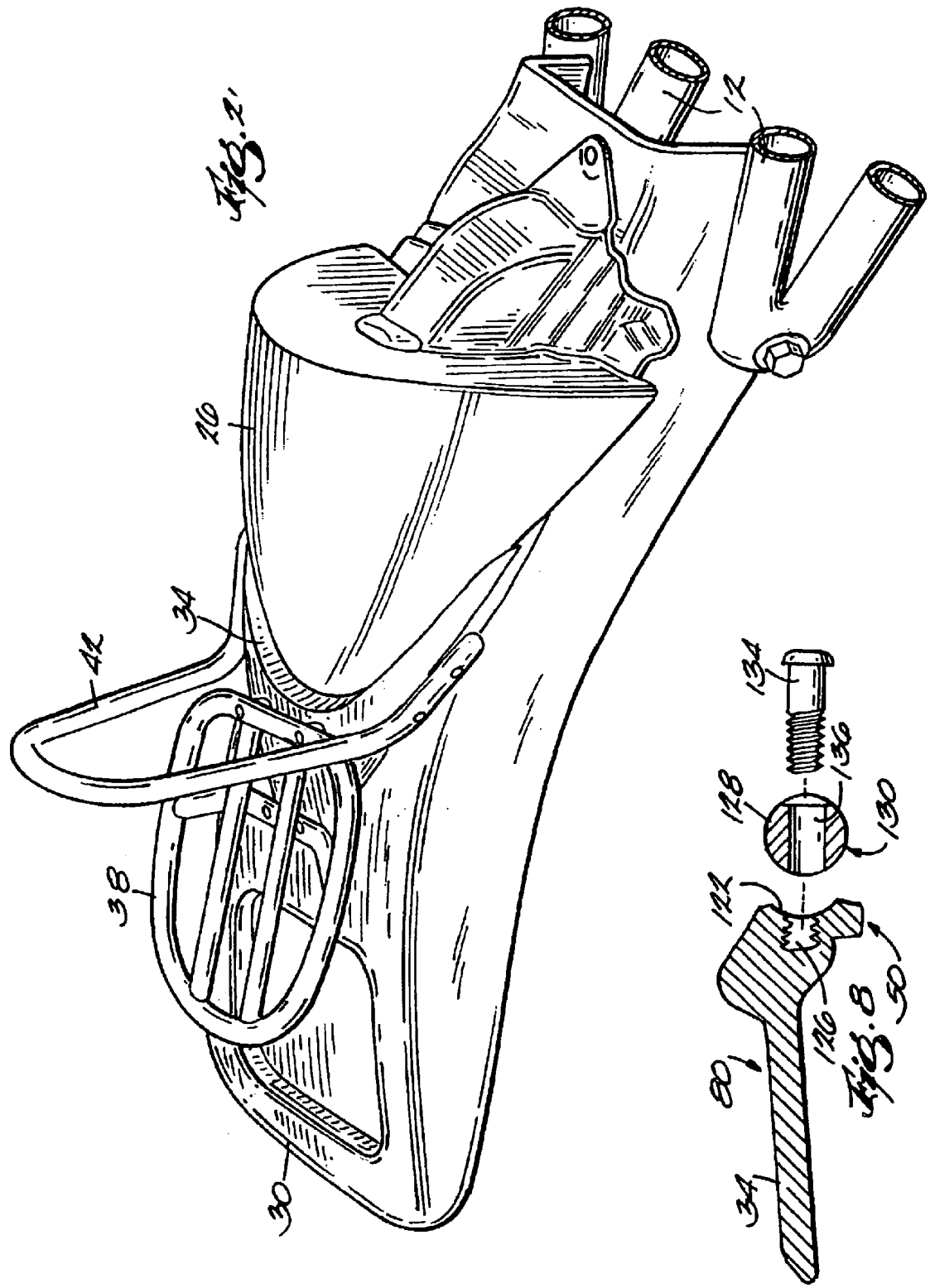
FIG. 2 is an enlarged perspective view of the rear portion of the motorcycle.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

FIG. 1 illustrates a motorcycle 10 including a frame 12, a steering assembly 14, a front wheel 18, a rear wheel 22, and a seat 26. A rear fender 30 extends rearwardly of the seat 26 and is disposed substantially over the rear wheel 22. A mounting member 34 is mounted atop the rear fender 30 and extends rearwardly of the seat 26. As desired by an operator, a luggage rack 38 and a backrest 42 are fixed to the mounting member 34; however, the mounting member 34 is designed to be left on the motorcycle 10, even when one or both of the luggage rack 38 and backrest 42 are removed. In this regard, the mounting member 34 may be termed a "leave-on" piece.

Figure 3:
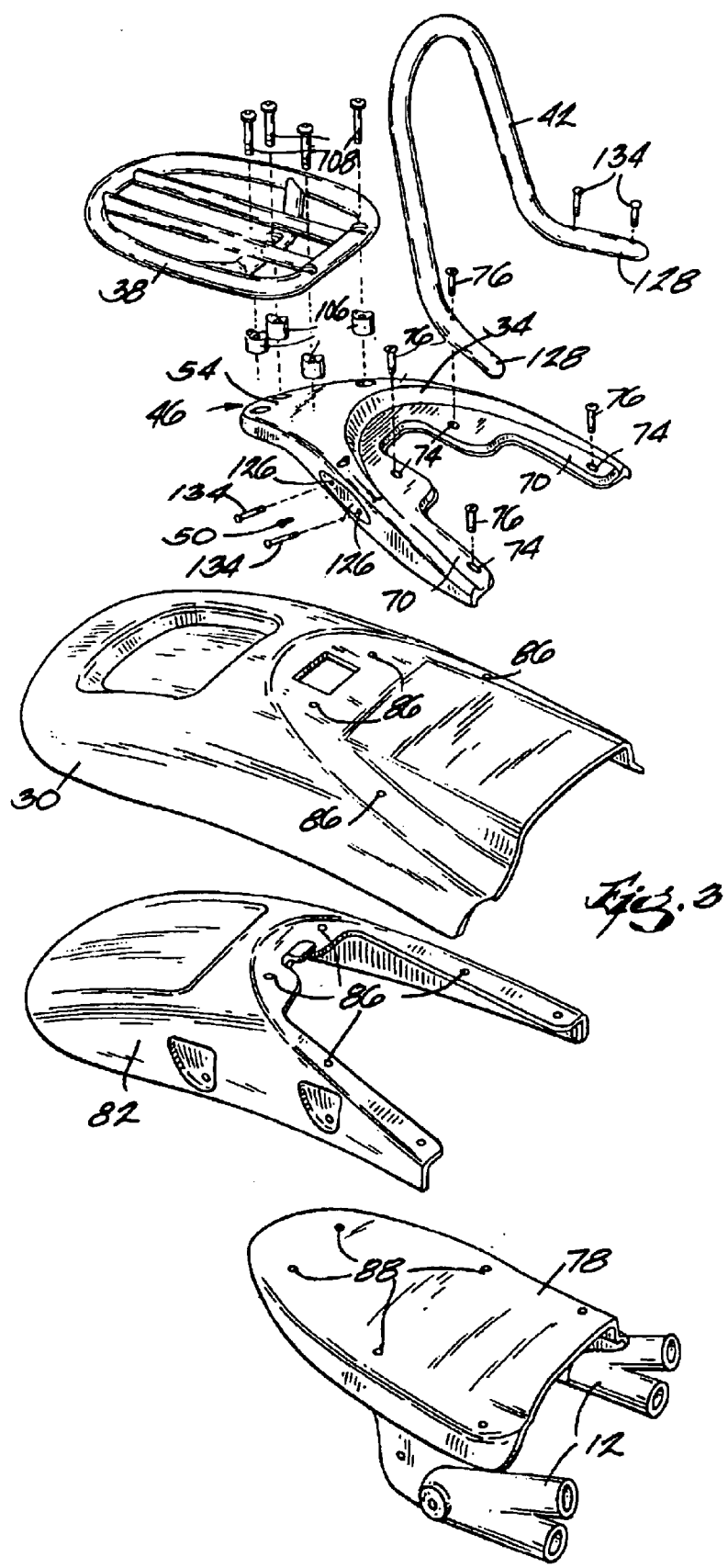
FIG. 3 is an enlarged exploded view of the rear portion of the motorcycle.
Figure 4:
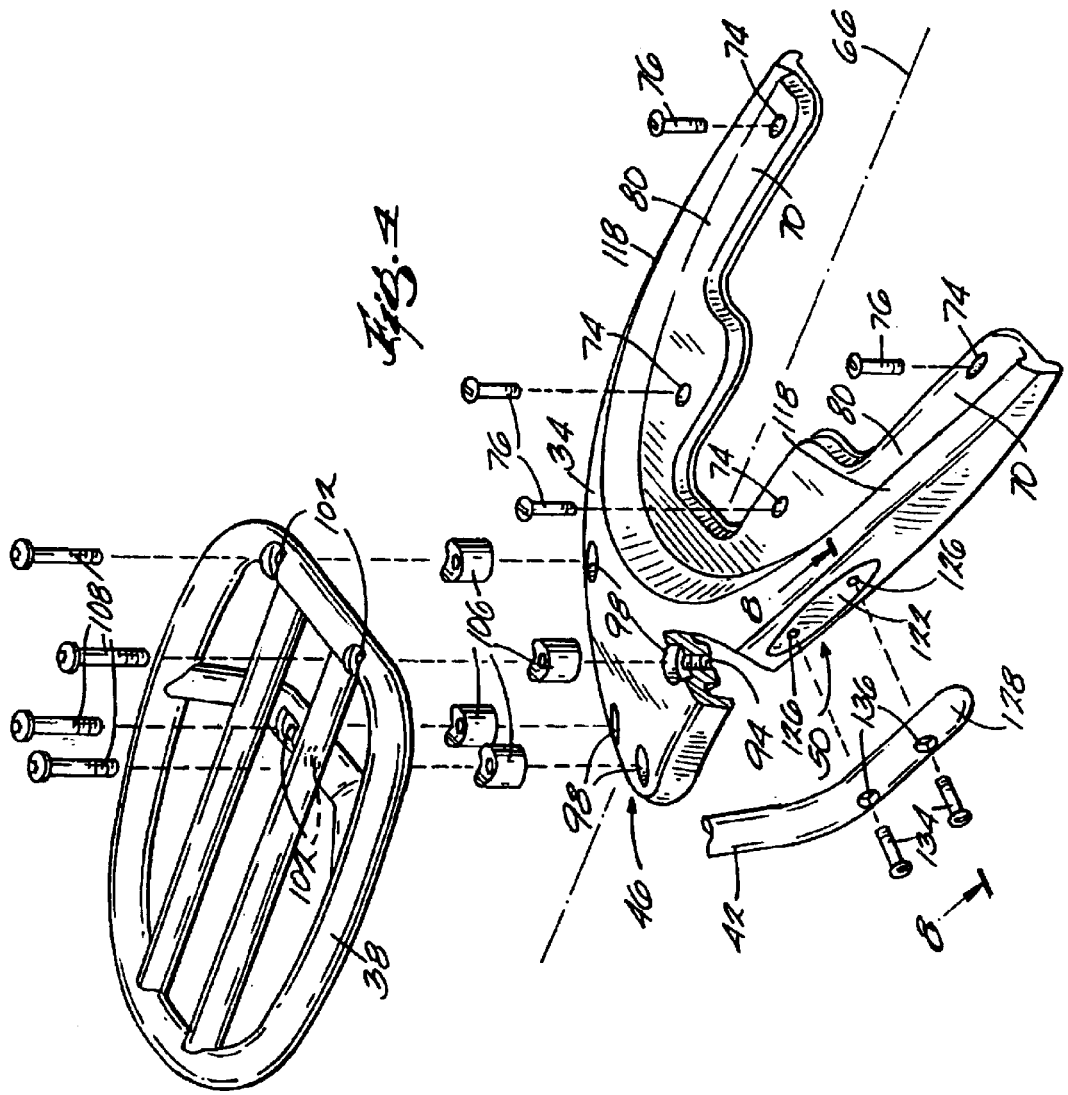
FIG. 4 is an enlarged exploded view of the backrest and luggage rack mounting assembly with a portion partially cut away for illustrative purposes.

Referring now specifically to FIGS. 3 and 4, the mounting member 34 includes a luggage rack mounting portion 46, a backrest mounting portion 50 defined in each of the side surfaces (only one of the side surfaces being illustrated but the opposite side surface being substantially identical to the side shown), and an arcuate top surface 54. The mounting member 34 is generally Y-shaped, has a longitudinal axis 66, and has first and second arms 70 positioned on opposite sides of the axis 66. At least one of the arms 70 includes at least one mounting aperture 74 (e.g., two apertures 74 per arm 70 as illustrated), through which a fastener 76 may be extended to secure the mounting member 34 to a seat pan portion 78 of the frame 12. The seat 26 is preferably made of a resilient material such as foam rubber and is removably mounted to the frame 12. Under operating conditions, the seat 26 contacts an upper surface 80 of the mounting member 34 and covers all of the fasteners 76.

Referring particularly to FIG. 3, the motorcycle 10 also includes an inner fender 82. The inner fender 82 and the rear fender 30 each define apertures 86, such that when these components and the mounting member 34 are properly aligned above the seat pan portion 78, the fasteners 76 may be extended through the mounting apertures 74 of the mounting member 34, through the apertures 86 of the inner fender 82 and the rear fender 30, and into threaded bores 88 in the seat pan portion 78. Tightening the fasteners 76 draws the mounting member 34 and the seat pan portion 78 together, sandwiching the inner fender 82 and the rear fender 30 between the mounting member 34 and the seat pan portion 78. To aid assembly, the various apertures 74, 86 may include slots to accommodate misalignment between the parts. It should be noted that additional or alternative components may be installed in a similar manner as the inner fender 82 and the rear fender 30 between the mounting member 34 and the seat pan portion 78 without altering the scope or spirit of the present invention.

Referring particularly to FIG. 4, at least one (e.g. four as illustrated) substantially vertical threaded bore 94 extends through the arcuate top surface 54 of the mounting member 34. The luggage rack mounting portion 46 also includes flat portions or counterbores 98, which are recessed with respect to the arcuate top surface 54, and which surround the threaded bores 94 to provide a substantially flat mounting area. The luggage rack 38 includes apertures 102 that register with the threaded bores 94 of the mounting member 34. Tubular spacers 106 are placed between the luggage rack 38 and the flat portions 98 of the luggage rack mounting portion 46 such that luggage rack fasteners 108 may be extended through the apertures 102, through the tubular spacers 106, and threaded into the threaded bores 94 to affix the luggage rack 38 to the mounting member 34. The luggage rack 38 extends rearwardly of the mounting member 34 and is thus mounted to the mounting member 34 in a cantilevered fashion.

Referring now particularly to FIGS. 5–7, the luggage rack mounting portion 46 of the mounting member 34 defines a downwardly facing cavity 110. Within the cavity 110 are a plurality of stiffening ribs 114 that are arranged generally parallel to the longitudinal axis 66 of the mounting member 34. The arms 70 of the mounting member 34 include a collar 118 with an inverted J-shaped cross section 122. The combination of the stiffening ribs 114 and the collar 118 increases the overall moment of inertia of the mounting member 34. The increased moment of inertia resists bending moments about a horizontal line that is perpendicular to the longitudinal axis 66 caused by the weight of the cantilevered luggage rack 38 and packages mounted thereto.

Referring to FIGS. 3, 4, and 8, the backrest mounting portions 50 include elongated concave recesses 122 in the side surfaces of the mounting member 34. A pair of substantially horizontal threaded bores 126 extend into the side surfaces within each concave recess 122. The backrest 42 includes elongated rods 128 having rounded side surfaces 130 that are snugly received in the elongated concave recesses 122. Although the elongated rods 128 of the illustrated backrest 42 have circular cross sections, the structure of the backrest 42 can take on virtually any shape, provided it includes rounded side surfaces 130 that snugly engage the concave recesses 122 in the mounting member 34.

A pair of backrest fasteners 134 extend through apertures 136 in each elongated rod 128 and are threaded into the threaded bores 126. The snug engagement between the rods 128 and the concave recesses 122 relieves shear stress on the horizontal fasteners 134 by providing support to the elongated rods 128 in a substantially vertical direction. More specifically, the recesses 122 support the rods 128 from above and below to resist a majority of the vertically-directed forces.

FIGS. 9 and 10 illustrate the motorcycle 10 with the mounting member 34 mounted thereto, but without the backrest 42 or luggage rack 38 installed. The mounting member 34 has a curved bottom surface 142 having a curvature substantially matching the curvature of the arcuate top surface 146 of the rear fender 30. Thus, substantially the entire bottom surface 142 is in continuous contact with the arcuate top surface 146 of the rear fender 30.

With reference to FIG. 10, the side surfaces of the mounting member 34 are curved to follow the curvature of an outer edge 150 of the motorcycle seat 26, when viewed from above. With reference to FIG. 9, because the seat 26 is positioned over a portion of the mounting member 34, and because the collar 118 of the mounting member 34 embraces the bottom of the seat 34, the mounting member 34 has an integrated appearance on the motorcycle 10. In fact, the curvature of the top surface 54 suggests continuity between a curved top surface 154 of the seat 26, and the curved top surface 146 of the rear fender 30, when viewed from the rear and from the sides of the motorcycle 10. As a result, the mounting member 34 may be left on the motorcycle 10 when the luggage rack 38 and/or the backrest 42 are not installed without detracting from the overall visual appeal of the motorcycle 10.

What is claimed is:

1. A motorcycle comprising:
   a frame;
   a steering assembly pivotally mounted to said frame;
   a front wheel rotatably mounted to said steering assembly and supporting a front end of said motorcycle;
   a rear wheel rotatably interconnected with a rear portion of said frame and supporting a rear end of said motorcycle;
   a mounting member coupled to said frame, said mounting member including a luggage rack mounting portion, and having a top surface facing away from said frame, and a bottom surface facing toward said frame;
   a seat mounted over a portion of said top surface of said mounting member to sandwich a portion of said mounting member between said seat and said frame, wherein said seat is not portioned over said luggage rack mounting portion; and
   a luggage rack mounted to said luggage rack mounting portion of said mounting member, wherein said mounting member includes a longitudinal axis and first and second arms positioned on opposite sides of said longitudinal axis, said first and second arms being sandwiched between said seat and said frame.

2. A motorcycle as in claim 1, wherein said luggage rack mounting portion of said mounting member extends rearwardly of said seat.

3. A motorcycle as in claim 1, wherein said luggage rack mounting portion includes an arcuate top surface, wherein said luggage rack mounting portion also includes a substantially flat portion at least partially recessed with respect to said arcuate top surface, and wherein said luggage rack mounting portion also includes a substantially vertical threaded bore extending through said flat portion, said motorcycle further comprising a threaded fastener extending substantially vertically through a portion of said luggage rack and threaded into said threaded bore.

4. A motorcycle as in claim 1, further comprising a rear fender disposed over said rear wheel and extending rearwardly of said seat, said rear fender having an arcuate top surface, wherein said bottom surface of said mounting member has a curvature substantially matching said arcuate top surface of said rear fender, and wherein substantially the entire bottom surface of said mounting member is in continuous contact with said arcuate top surface of said rear fender.

5. A motorcycle as in claim 1, wherein said mounting member includes at least one side surface and a backrest mounting member formed in said at least one side surface, said motorcycle further comprising a backrest mounted to said backrest mounting portion.

6. A motorcycle as in claim 1, wherein said luggage rack extends rearwardly of said mounting member in a generally cantilever fashion.

7. A motorcycle as in claim 1, wherein at least one of said arms includes a mounting aperture therethrough, said motorcycle further comprising a fastener extending through said mounting aperture and securing said mounting member to said frame.

8. A motorcycle as in claim 7, wherein said first and second arms include a collar, the collar having an inverted J-shaped cross section to increases the overall moment of inertia of said mounting member.

9. A motorcycle as in claim 1, wherein said luggage rack mounting portion of said mounting member defines a downwardly-opening cavity and a plurality of stiffening ribs within said cavity, said ribs increasing the overall moment of inertia of said mounting member.

10. A motorcycle comprising:

a frame including a seat pan portion;

a steering assembly pivotally mounted to said frame;

a front wheel rotatably mounted to said steering assembly and supporting a front end of said motorcycle;

a rear wheel rotatably interconnected with a rear portion of said frame and supporting a rear end of said motorcycle;

a mounting member mounted to said seat pan portion, said mounting member including a luggage rack mounting portion, a top surface facing away from said seat pan portion, a bottom surface facing toward said seat pan portion, and side surfaces extending between said top and bottom surfaces, said mounting member further including a backrest mounting portion defined in at least one of said side surfaces;

a seat mounted over said top surface of said mounting member to sandwich a portion of said mounting member between said seat and said seat pan portion;

a luggage rack mounted to said luggage rack mounting portion of said mounting member rearward of said seat; and a backrest mounted to said backrest mounting portion of said mounting member.

11. A motorcycle comprising:

a frame;

a steering assembly pivotally mounted to said frame;

a front wheel rotatably mounted to said steering assembly and supporting a front end of said motorcycle;

a rear wheel rotatably interconnected with a rear portion of said frame and supporting a rear end of said motorcycle;

a rear fender mounted to said frame over said rear wheel;

a mounting member mounted on top of said rear fender, said mounting member having a top surface facing away from said seat pan portion, a bottom surface facing toward said seat pan portion, and side surfaces extending between said top and bottom surfaces, said mounting member further including a backrest mounting portion defined in at least one of said side surfaces;

a seat mounted over said top surface of said mounting member to sandwich a portion of said mounting member between said seat and said seat pan portion; and a backrest mounted to said backrest mounting portion of said mounting member.

12. The motorcycle of claim 11, wherein said backrest mounting portion includes a concave recess formed in at least one of said side surfaces, wherein said backrest includes a portion having a rounded side surface snugly received within said concave recess.

13. A motorcycle as in claim 2, wherein said backrest mounting portion includes at least one substantially horizontal threaded bore extending through said side surface and positioned within said concave recess, said motorcycle further comprising at least one fastener extending through said backrest and threaded into said horizontal threaded bore and mounting said backrest to said backrest mounting portion.

14. The motorcycle of claim 13, wherein when said backrest is under ordinary operating load there is substantially no shear stress on said fastener due to the engagement between said recess and said rounded side surface.

15. A motorcycle as in claim 12, wherein said portion of said backrest includes an elongated rod having a circular cross section, wherein said recess is elongated to accommodate a length of said elongated rod, and wherein the curvature of said cross-section substantially corresponds to the curvature of said concave recess.

16. A motorcycle as in claim 12, wherein substantially the entire concave recess is engaged with said rounded side surface of said backrest.

17. A Y-shaped mounting member configured for use on the rear portion of a motorcycle, the mounting member comprising:

a generally arcuate top surface;

a generally arcuate bottom surface;

side surfaces extending between said top and bottom surfaces;

a luggage rack mounting portion defining at least one substantially vertical aperture in a rear portion of said mounting member;

a backrest mounting portion defining at least one substantially horizontal aperture defined in said side surfaces of said mounting member.

18. The mounting member of claim 17, further comprising first and second arms, each of said arms having a collar with an inverted J-shaped cross section.

19. The mounting member of claim 17, further comprising stiffening ribs and arms having a collar with an inverted J-shaped cross section, wherein said stiffening ribs and said J-shaped cross section increase the overall moment of inertia of said mounting member.

* * * * *